US007865831B2

(12) United States Patent
Dooley et al.

(10) Patent No.: US 7,865,831 B2
(45) Date of Patent: Jan. 4, 2011

(54) METHOD OF UPDATING CONTENT FOR AN AUTOMATED DISPLAY DEVICE

(75) Inventors: Christopher Dooley, New Cannan, CT (US); Paul Nielsen, Saratoga Springs, NY (US)

(73) Assignee: Clever Innovations, Inc., Saratoga Springs, NY (US)

(*) Notice: Subject to any disclaimer, the term of this patent is extended or adjusted under 35 U.S.C. 154(b) by 882 days.

(21) Appl. No.: 11/735,118

(22) Filed: Apr. 13, 2007

(65) Prior Publication Data
US 2007/0266323 A1 Nov. 15, 2007

Related U.S. Application Data

(60) Provisional application No. 60/792,230, filed on Apr. 14, 2006, provisional application No. 60/888,040, filed on Feb. 2, 2007.

(51) Int. Cl.
G06F 3/00 (2006.01)
(52) U.S. Cl. .................. 715/719; 715/748; 715/704; 715/730; 715/733; 715/962; 705/14.38; 705/14.59; 705/14.65
(58) Field of Classification Search .......... 715/719, 715/704, 708, 716, 730, 733, 748, 749, 764, 715/862, 867, 962; 340/500, 539.23, 539.25, 340/539.26, 539.3, 540, 541, 545.3, 555–557, 340/565, 575, 693.3; 713/300, 310, 320, 713/324, 340; 705/14, 14.37, 14.38, 14.58, 705/14.59, 14.65
See application file for complete search history.

(56) References Cited

U.S. PATENT DOCUMENTS

| 4,853,678 | A | 8/1989 | Bishop, Jr. et al. |
|---|---|---|---|
| 5,463,209 | A | 10/1995 | Figh et al. ............. 235/383 |
| 5,657,004 | A | 8/1997 | Whittaker et al. |
| 5,926,404 | A | 7/1999 | Zeller et al. ............. 364/707 |
| 5,928,347 | A * | 7/1999 | Jones ..................... 710/305 |
| 5,966,696 | A | 10/1999 | Giraud ................... 705/14 |
| 5,983,069 | A | 11/1999 | Cho et al. |
| 6,418,536 | B1 | 7/2002 | Park |
| 6,494,363 | B1 | 12/2002 | Roger et al. |
| 6,535,132 | B2 | 3/2003 | Waters et al. .......... 340/573.1 |
| 6,536,658 | B1 | 3/2003 | Rantze |
| 6,690,275 | B2 | 2/2004 | Long et al. |
| 6,734,845 | B1 | 5/2004 | Nielsen et al. ........ 345/211 |
| 2002/0116265 | A1 | 8/2002 | Hernandez ............. 705/14 |
| 2002/0184098 | A1 | 12/2002 | Giraud et al. ........... 705/14 |
| 2003/0018526 | A1 | 1/2003 | Fantner ................. 705/14 |
| 2003/0051182 | A1 | 3/2003 | Tsirkel et al. ........... 713/320 |
| 2003/0078840 | A1 * | 4/2003 | Strunk et al. ........... 705/14 |

(Continued)

FOREIGN PATENT DOCUMENTS

CA 2376896 A1 3/2002

(Continued)

Primary Examiner—Ba Huynh
Assistant Examiner—Rashedul Hassan
(74) Attorney, Agent, or Firm—Michael Crilly, Esq.

(57) ABSTRACT

A self-powered video display device provides an automated point of purchase advertising display that includes a readily programmable and re-programmable operating system. The display device is updated through the connection of a memory card or handheld computer and the transfer of video and other files over the connection.

20 Claims, 17 Drawing Sheets

U.S. PATENT DOCUMENTS

| | | |
|---|---|---|
| 2003/0113094 A1 | 6/2003 | Tewksbury |
| 2003/0115096 A1* | 6/2003 | Reynolds et al. ............... 705/14 |
| 2003/0167203 A1 | 9/2003 | Thorne et al. ................. 705/14 |
| 2004/0013028 A1 | 1/2004 | Lim ........................... 365/244 |
| 2004/0044574 A1 | 3/2004 | Cochran et al. ............... 704/14 |
| 2004/0044723 A1* | 3/2004 | Bell et al. ................... 709/203 |
| 2004/0044724 A1* | 3/2004 | Bell et al. ................... 709/203 |
| 2004/0109015 A1* | 6/2004 | Peng ........................... 345/716 |
| 2004/0150526 A1 | 8/2004 | De La Garza ............ 340/573.1 |
| 2004/0201488 A1 | 10/2004 | Elul ........................ 340/686.6 |
| 2004/0207511 A1 | 10/2004 | McEwan |
| 2004/0217876 A1 | 11/2004 | Blum et al. ............... 340/815.4 |
| 2005/0080671 A1 | 4/2005 | Giraud et al. ................. 705/14 |
| 2005/0261958 A1 | 11/2005 | Hageman |
| 2006/0044149 A1 | 3/2006 | Blum et al. ................. 340/687 |
| 2006/0190750 A1 | 8/2006 | Maggi et al. |

FOREIGN PATENT DOCUMENTS

| | | |
|---|---|---|
| CA | 2405526 A1 | 10/2002 |
| CA | 2471359 A1 | 6/2004 |
| CA | 2500291 A1 | 3/2005 |
| CA | 2451877 | 6/2005 |

* cited by examiner

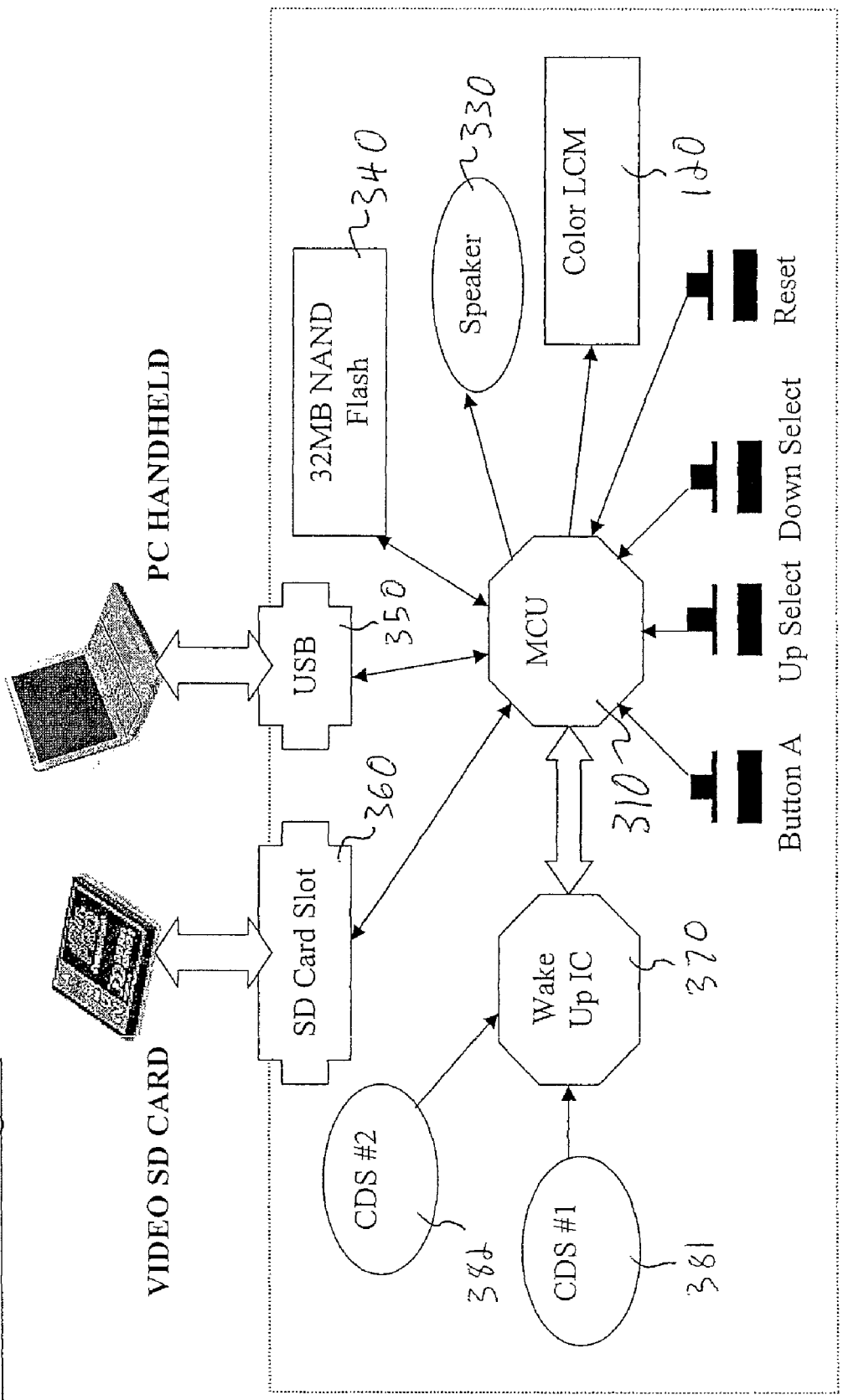

SELECT INFORMATIONAL VIDEO FILES TO IMPORT

Button    A

Enter Video Name to Import [        ]📁

Alternate Video 1 [        ]📁

Alternate Video 2 [        ]📁

Alternate Video 3 [        ]📁

[ HIDE ALT ]    ⟩NEXT⟩

SELECT TEASER VIDEO FILES TO IMPORT

MOTION
DETECTOR

Enter Video Name to Import [        ]📁

[ ALT ]

*No Teaser Used* ☐    ⟨BACK⟨ ⟩NEXT⟩

FIG. 8

*SELECT TEASER VIDEO FILES TO IMPORT*

MOTION DETECTOR

Enter Video Name to Import

Alternate Video 1    HIDE ALT

Alternate Video 2    *No Teaser Used* ☐

Alternate Video 3

End Video For All    BACK   NEXT

1000

Number automatically updated when X and Y variables are entered. Number = X * Y + 20.

FIG. 11

| SETTING | DROP DOWN MENU OPTIONS |
|---|---|
| Volume Level Setting | High, Medium, Low |
| Min Delay between Motion Detector activations | 030 – 999 (in 1 sec increments) |
| Motion Detector Sleep Mode Settings: | |
| Sleep Mode occurs if motion detector triggered (times) | 1-9 times (in 1 times increments) |
| Motion Detector turned off for (secs) | 1-9 mins (in 1 min increments) |
| Motion Detector & Button Sleep Mode Settings: | |
| Sleep Mode occurs if buttons are pressed ≥ | 1-9 times (in 1 times increments) |
| | |
| | |

FIG. 12

FILM NUMBER

Enter Film Number [　　　　　]

Enter Description [　　　　　]

BACK  FINISH

FIG. 13 1500

TRANSFER SOFTWARE PROGRESS

USB Connection Troubleshooting

Connect USB Cord to Shelf Vision Unit & PC Handheld.
Be sure that both ends of cord plug are fully inserted into
USB sockets of Shelf Vision Unit & PC Handheld.

Check Again

FIG. 14 1600

TRANSFER SOFTWARE PROGRESS

USB Connection Troubleshooting

Disconnect and then reconnect USB Cord from both
Shelf Vision Unit & PC Handheld.
Be sure that both ends of cord plug are fully inserted into
USB sockets of Shelf Vision Unit & PC Handheld.

Check Again

FIG. 15 1700

TRANSFER SOFTWARE PROGRESS

USB Connection Troubleshooting

Press Reset Button inside battery compartment.
Connect USB Cord to Shelf Vision Unit & PC Handheld.
Be sure that both ends of cord plug are fully inserted into
USB sockets of Shelf Vision Unit & PC Handheld.

Check Again

FIG. 31

```
VIDEO CARD CYCLE # 07-06

TRANSFERRED FILM #
123456791  TIDECLEAN

Transfer Complete!
Remove Video Card.
```

METHOD OF UPDATING CONTENT FOR AN AUTOMATED DISPLAY DEVICE

RELATED APPLICATIONS

This application claims the priority benefit of Provisional Application No. 60/792,230 filed on Apr. 14, 2006, and Provisional Application No. 60/888,040 filed on Feb. 2, 2007, which applications are hereby incorporated by reference in their entirety.

BACKGROUND OF THE INVENTION

1. Field of the Invention

The present invention relates to automated display devices. More specifically, the present invention relates to a method of updating the content information to be displayed on an automated shelf-display device.

2. Description of the Related Art

Shelf-display devices have been announced which can be configured to be placed on point of purchase shelving in super markets. Examples of such display devices are the ShelfCast announced by Vestcom International and the Shelf Ads from P.O.P. Broadcasting Co.

The known devices have several disadvantages. Their operation can be too simplistic. In particular, they may not have any ability to accurately sense a person's nearby presence or motion, or they may require a person to take steps to initiate operation of the device. The power consumption of these devices may not be optimal for their use, due to the absence of any power conservation software. Furthermore, the devices do not permit the content information to be easily updated without the costs of a network system for distributing the content.

Accordingly, what is not appreciated in the related art is the need for an improved display unit that overcomes the detriments noted above.

OBJECTIVES AND SUMMARY

A main objective is to produce an automated display device that overcomes at least one of the detriments noted above.

Another objective is to facilitate the rapid and simple updating of the video content displayed by the device.

There is also an objective to provide an improved point of purchase display device that is, in combination, largely automated in terms of both operation and recognition of the presence of a person, not reliant on an external power source or network, and which incorporates power management features.

The preferred embodiments of the present invention relate to a stand alone video display device, attachable to shelving, that provides an automated advertising display with a consumer sensing activation feature, and a power management function to manage power usage during periods of use and non-activation, and a readily programmable and re-programmable operating system.

The above, and other objectives, features and advantages of the preferred embodiments of the present invention will become apparent from the following description read in conduction with the accompanying drawings, in which like reference numerals designate the same elements.

BRIEF DESCRIPTION OF THE DRAWINGS

FIG. 3 is a block diagram of the electronic components of a display unit according to one embodiment of the invention.

FIG. 6 is an exemplary Window 800, permitting the identification of two additional alternate video files.

FIG. 7 is an exemplary Teaser Window 900 for identifying a teaser video file to import.

FIG. 8 is an exemplary Window 1000 for identifying additional alternate teaser video files.

FIG. 11 is an exemplary menu of exemplary volume settings.

FIG. 12 is an exemplary Window 1400, where the user is prompted to enter the "Film Number" that identifies data file.

FIGS. 13-18 are various exemplary troubleshooting windows that may appear during the process of establishing a USB connection.

FIG. 31 is an exemplary window that may be displayed when the transfer of a video file is complete.

DETAILED DESCRIPTION OF THE PREFERRED EMBODIMENTS

Figure 2F:
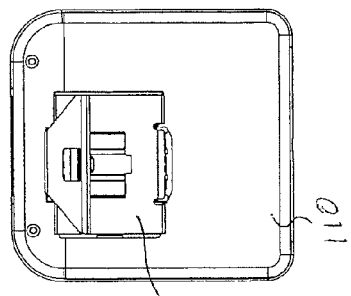
FIG. 2F is a rear view of the automated display unit in FIG. 1.
Figure 2E:
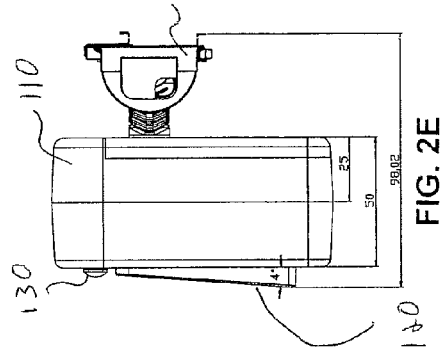
FIG. 2E is a right-side view of the automated display unit in FIG. 1
Figure 2B:
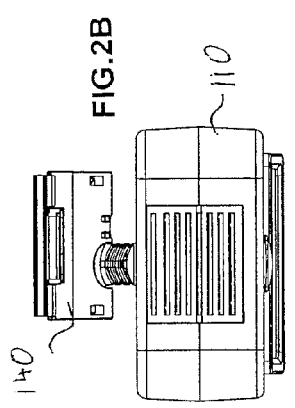
FIG. 2B is a top view of the automated display unit in FIG. 1.
Figure 2A:
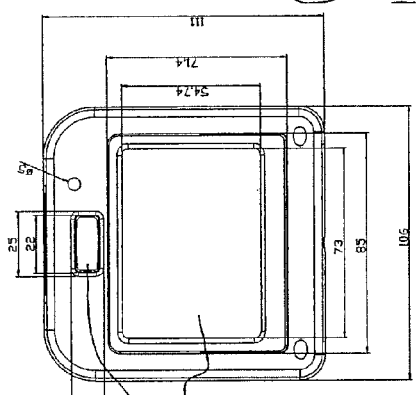
FIG. 2A is a front view of the automated display unit in FIG. 1.
Figure 2C:
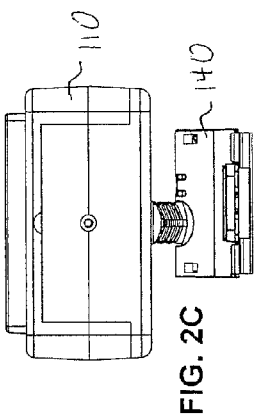
FIG. 2C is a bottom view of the automated display unit in FIG. 1.
Figure 2D:
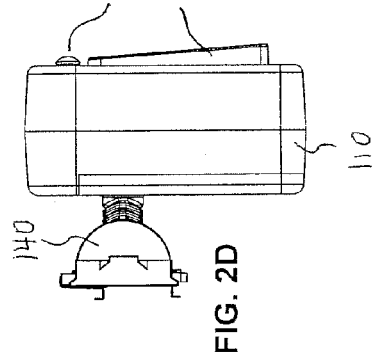
FIG. 2D is a left-side view of the automated display unit in FIG. 1.
Figure 1:
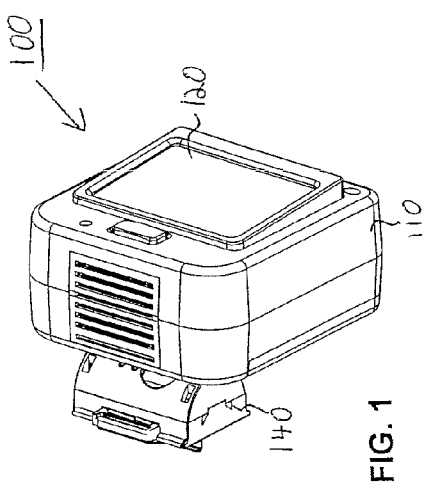
FIG. 1 is a perspective view of an automated display unit according to one embodiment of the present invention.

Reference will now be made in detail to several preferred embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through intermediary elements or devices.

Referring now to FIGS. 1 and 2A-2F, an automated display unit 100 is provided. Display unit 100 includes a housing 110 that functions to support the internal mounting of electronic components and a power supply and to support a video display element 120, such as an LCD display, and a button 130. The display element 120 may be an inorganic LCD display, or any other effective video display apparatus, including an organic LED display (OLED), plasma display, or other type of image display as may be developed within the future suitable for the particular purpose herein.

A touch screen display may be integrated in a manner consistent with the power management system discussed herein. Thus, while minor adaptations would be made to operate a touch screen display or operate a touch screen activation mode, such adaptations do not teach away from the present invention, but are another embodiment of the invention.

The button 130 may be any kind of effective and suitable physically-actuated activation switch, or a capacitive or resistive touch-screen type display device that permits user selection by touching a portion(s) of the screen. Instead of a single button 130, alternative embodiments may have a plurality of buttons or switches. If so, the switches can be implemented with different respective functions. For example, one switch may operate a "teaser" advertisement, a video of short duration designed to draw a consumer's immediate attention to the display. Another switch may provide for a "regular" or longer advertisement. The longer advertisements may range in duration from a couple seconds to several minutes depending upon unit design and programming desired by an operator. A preferred range of advertisement duration is from 15-45 seconds. Yet another switch may provide "more information" or a set of additional summaries or consumer information points, for example nutritional facts, coupon availability, or additional details.

A fixing apparatus 140, for clamping display device on shelving may be provided. Not limited to apparatus 140, any commonly available claiming or securing mechanism may be adapted to securely hold display unit 100 on a shelf, display edge, or other fixed location so as to position display unit 100 in a manner convenient for both motion sensor operation and consumer viewing of display element 120. In an alternative embodiment, a repositionable and lockable stalk member (not shown) that enables display device 100 to be repositioned to adapt to difficult locations.

FIG. 3 is a block diagram of various electronic components within automated display device 100. This diagram is not meant to be exhaustive of the electrical components used within display device 100, but is merely illustrative to assist in describing the stored software and hardware utilized to operate display unit 100 in the manner described herein. There may be additional processors, RAM or ROM memory devices 8 or both including NAND/NOR flash type memory, masked ROM, or a hard drive, or any other storage medium 8 for storing control and operation information, video images and audio data.

Additionally, display device 100 may include a number of operationally orientated programs for operating the LCD, receiving consumer input, and tracking operational and triggering data. These programs preferably include a power management software program that allows display unit 100 to operate for an extended period of time without an external power supply. Such conservation software includes a low standby current design for use when unit 100 is not delivering an advertising message, as well as a busy store over-ride feature that keeps the unit in a standby condition when a pre-determined quantity of "on" activations occurs in a short time period.

A microcontroller unit (MCU) 310 controls the general operation of the device under at least some element of software of firmware control. For example, MCU 310 controls video playback on LCM display 120, sound output through speaker 330, read/write operations of video content files and programming data to non-volatile memory, such as a NAND flash memory 340, a computer interface such as USB interface 350 for downloading files to the device from a computer, and a memory interface such as SD card slot 360 for transferring files between the device and a flash memory card. There is also a Wake Up IC 370 with power saving capabilities, that in turn controls CDS sensors 381 and 382, which interacts with MCU 310. Although there are separate arrows between each component and MCU 310 in the drawings, two or more of the components may communicate with MCU 310 via a common data bus. MCU 310 may be any suitable microcontroller unit, and is preferably a highly integrated system-on-a-chip for general-purpose applications including a CPU, memory and I/O controller, a SD/MMC memory interface, a USB mini-host/device, a color STN-LCD and TFT-LCD interface, and embedded SRAM and ROM. By providing a complete set of common system peripherals, a preferable microcontroller unit minimizes overall system costs and eliminates the need to configure additional components while providing high-speed performance of the functions described in this application.

Schematic diagrams of an exemplary, non-limiting, implementation of the electronics and circuitry for the display device are shown in FIGS. 4A-4F of Provisional Application No. 60/888,040 filed on Feb. 2, 2007. A Bill of Materials (BoM) for the exemplary, non-limiting, implementation is shown in FIG. 5 of Provisional Application No. 60/888,040 filed on Feb. 2, 2007. The circuitry in any one of FIGS. 4A-4F of said provisional application may be modified irrespective of the circuitry in the other figures. The circuitry and electronics are preferably, but need not be, mounted on a single printed circuit board.

USB interface 350 may be an externally accessible connection port (USB format), or an internal connection port (also a USB type connection port). In either situation, field personnel can physically connect to the display device (for example via a mini-USB connection) for downloading new programming information, for uploading data reporting items, and for otherwise operationally controlling display unit 100.

In one embodiment, USB interface 350 is positioned internally, allowing housing 110 to provide a sleek outward appearance and protecting the USB interface 350 from the ravages of working in a busy consumer environment where children and debris are present.

The MCU 310 preferably operates in a manner responsive to a plurality of buttons. There may be a main button 130, an Up Select button, and a Down Select button. The main button 130 is preferably a normally open, momentary, button that initiates some action, such as playing video messages, when pressed. The Up Select button and Down Select buttons may be used, for example, to navigate through a menu or make a selection displayed on LCM display 120. This is discussed further below with respect to the transfer of videos into the device through SD card slot 360. There may also be a normally open, momentary, reset button that resets the electronics when pressed. Despite the reset button, the device may automatically be reset periodically, such as every 24 hours. The main button 130 is preferably on the front of the device as shown in FIGS. 2A-2F, while the other buttons may be located on the back or the bottom of the device.

When the reset button on the display device 100 is pressed, it will reset the Display device unit. The unit will automatically reset itself every 24 hours using software and external components. Whenever the reset button is pressed either manually or automatically, the NAND flash memory will not be erased and it will return to normal operating status.

If the device experiences a prolonged period of inactivity, it will preferably go into a sleep (Dower conservation) mode. It will remain in the sleep mode unless woken up by Wake Up IC 370 or a press of main button A. When movement is detected by either one of sensor 381 or sensor 382, the Wake Up IC 370 takes the device out of sleep mode. When the device is taken out of sleep mode because one of the sensors detects movement, some pre-defined action may be performed. This predefined action may be, for example, the playing of a teaser video on LCM display 120. The sensors are preferably at least one of an optical sensor, Infra-Red (IR), a Radio Frequency (RF), or physical sensing device.

The two CDS sensors 381 and 382 are configured to detect movement anywhere in a selected range. The range may be, for example, anywhere from six feet to twelve feet. Preferably, the sensors are oriented 90 degrees apart, but may be at any angle between 45 degrees and 150 degrees. The sensors may be movable so that the angle and range of the sensors can be varied. This allows the device to be adjusted to work optimally in a given location. The device may be in an aisle of an unusual width or on an endcap of an aisle. Also, any number of sensors in any arrangement suitable for detecting movement may be utilized.

As an operational alternative, the motion sensors 381 and 382 may detect only a shadow because they are motion only CDS sensors that receive or watch for ambient light variations provided by the overhead store lighting. As a result, using this type of sensor, display device 100 detects only the shadow from a passing person but is highly efficient in power use when compared to IR or RF sensing devices that must generate a signal and sense a corresponding bounce-back signal.

The sensors may be configured in different manners. For example, the sensors may include a focusing lens in order to narrow and sharpen the light within the detection range and thereby conserve power. The sensors may further have a low cost photoresistor element, particularly one with low power consumption.

While not shown, alternative sensing devices may employ various focusing lenses, target-area definition "blinders", or other devices to control an actuation of the sensors, and hence avoid inadvertent activation of display device 100. Employing such target-area blinders or lenses, it is possible to restrict activation sensing to within a predetermined region proximate a front of housing 110. Since, in use, display device 100 is positioned proximate a point of purchase for consumer goods, and potentially an entire product category, it is preferred that the sensors be operational to key off of nearby consumers with potential product or category interest.

The photosensitive capability of the sensors may also be supplemented by software processing to better detect, not merely when a person comes within range of the device, but whether they are likely to be a shopper or other person coming into range of the device for the first time. For example, it is desired that a person who is stocking items or otherwise working in the aisle and constantly or repeatedly within range of the device would not repetitively trigger the device. To accomplish this goal, software in the device may process the sensor signals depending upon the intervals of detection by the sensor. If the detection interval is sufficiently large, it may be assumed that the person is coming into range and the device should be turned on. If the interval between subsequent detections is small, or there are repeated detections in a short period of time, it may be assumed that the person is not one for whom the device should be awakened from sleep mode, and the device should not be turned on despite a detection of motion by one of the sensors. Furthermore, the logic applied to the sensor signals so that the interval criteria, need not always be the same and may be dynamically adjusted during operation of the device. For example, the device can be programmed through software to learn the optimal interval or other criteria that is to be used to determine when the device is awakened from sleep mode.

The electronic components of the display device 100 preferably receive power from an internal or auxiliary power source rather than an external AC power source. In particular, a plurality of standard, inexpensive alkaline type batteries may be used. These batteries may be the smaller AA size or up to the larger D size alkaline battery. However, any suitable power source, ranging from lithium-ion batteries, to miniature camera batteries, to solar power or fuel cells, may be used to supply power to the components of display unit 100 in various embodiments of the invention.

Power management is variable within display device 100, based upon customer request, the present invention is readily adaptable to various power supply requests and demands regarding the overall size and shape of housing 110. As a result, while the use of AA, and D-cell batteries is provided, nothing herein shall limit the disclosure to the same. An audio device, preferably in the form of a miniature speaker 330 that will provide audio waves regarding the advertisement or promotional material to a triggering customer upon command, as will be discussed.

When the motion sensors detect motion, the display device 100 preferably plays a Teaser video as assigned by the conversion software. If the Teaser video is playing and button 130 is pressed, the Teaser video will stop playing and the informative video will interrupt and start playing.

When button 130 on the display device 100 is pressed, it will play the informative video as assigned by the PC Conversion software. If any button is pressed while an Informative Video is playing, it will not interrupt it. When the current Informative Video has stopped playing, a pressed button can then play the next Informative Video.

The device operates in three different modes. As discussed herein, power management software preferably enables operation in three modes.

The first mode is a "green mode" wherein a power chip operates the device in a semi-sleep mode. In the green mode, power is feed (preferably) only to the motion sensors and motion sensing is used to trigger operation. For the preferred CDS motion sensors, the current draw from the power supply will be only 15 microAmps (HA), thereby conserving power until the display device is triggered. But in some embodiments, other motion sensors such IR ultrasonic and opt electrical sensors may have greater current burdens. In the green mode, upon a first sensing of a consumer, the "teaser" video is displayed. Upon sensing multiple or longer-duration consumer activity, display device 100 may display the "regular" or complete advertisement, and possibly even an "information set" of video details.

The second mode is the "operating mode" in which the device is fully active and operational, and any operation of the display device triggers the video display. Verbal commands may wake up the device from either the green mode or the sleep mode into the normal operating mode. The current burden will be relatively large since it will include that needed for the LCD display 120 (approximately 100 milliAmps for a color screen), speaker 330, memory 340, and the other electronics. Nevertheless, in a preferred embodiment, the electronics will use no more than 200 milliAmps (mA) in the operating mode.

Finally, the third mode is a "full-sleep mode" in which a button or a touch screen needs to be contacted to awaken the display device 100. In this mode, the power savings is at a maximum since even the motion sensors are not operating. This mode may be triggered by a voltage sensor operating across the battery power supply determining that an exceptionally low voltage reading remains on battery life. The device is then forced to enter sleep mode from the green mode or operating mode. Since the sensors do not operate in the full-sleep mode, the device will not self-awaken despite the presence of a person within sensor range.

The displayed videos may be a series of stored bit map files for the video and corresponding .wav audio files may be used for the sound production. There may also be data reporting and data tracking functionality software, wherein certain numbers of actuation are tracked and cross-linked to particular segments of the promotional video or bit map file so that additional detail and data may be downloaded by service providers and provided to licensee customers. Where a touch screen display is used in the display device, sections of the touch screen may be similarly tracked and reported regarding consumer interest in the visual display.

In one preferred embodiment, the data recording and transfer mode provided for unit 100 is designed to record the usage of the unit and transfer the recorded back to a another device during an update or a change of the display device. This data can then be used to measure the number of advertising impressions, tune the activation timing (firmware operation) to maximize performance, adjust an advertising messaging and otherwise provide battery change out advice to the support staff regarding time in use, time to replace (remaining life), efficacy, voltage level during use, etc.

Updates to the content displayed by the display device may be made by connecting a flash memory or physically replacing a memory card. Where actual updating of a memory is done on location, the use of particular separate memory modules allow the update, or allow the receipt of and vetting of a particular update code prior to overwriting of the existing memory. This serves the function of preservation of prior programming in a situation where the device is unreliable, the software is unreliable, or the operational controller may have difficulty updating the new system.

Figure 4A:
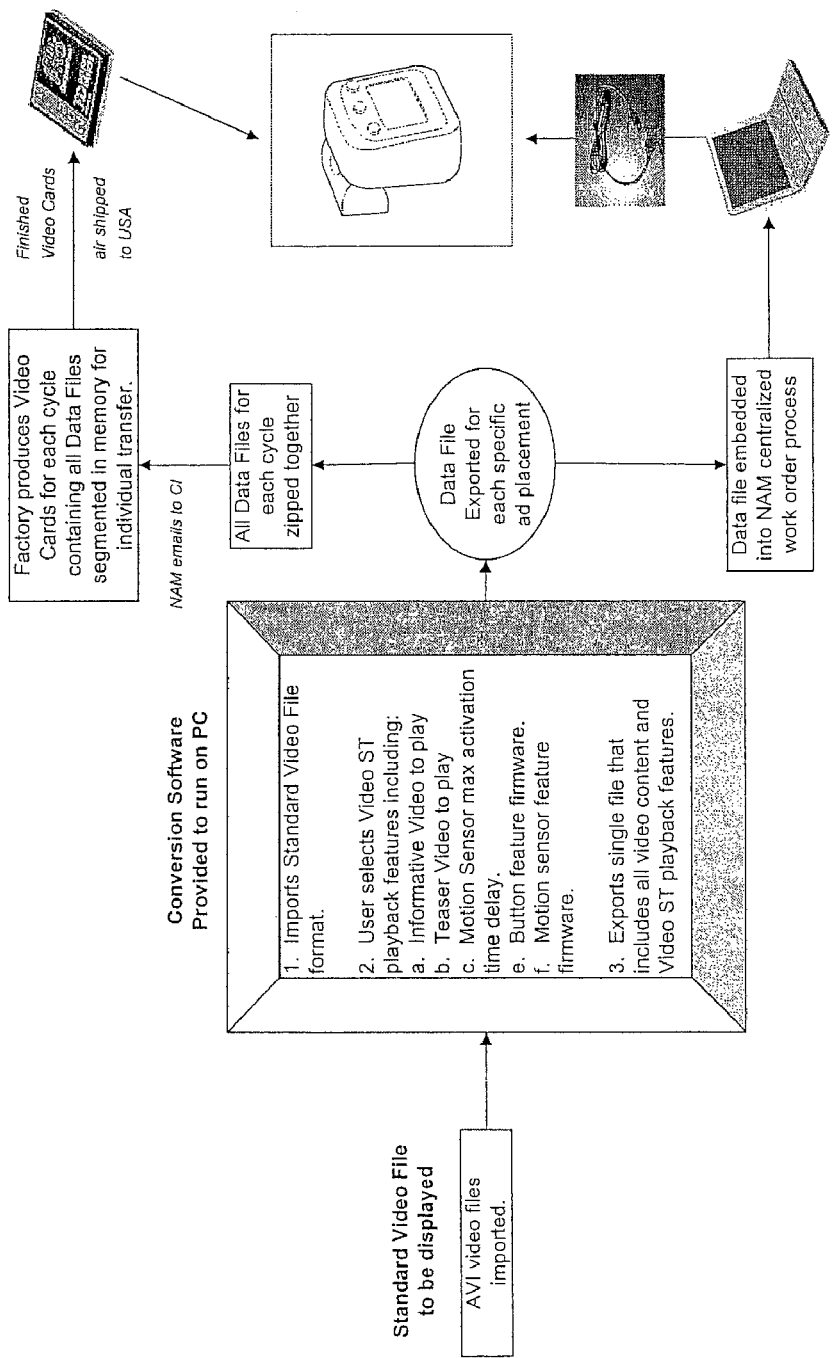
FIG. 4A is a diagram illustrating an exemplary, non-limiting, embodiment of the method of updating the content information to be displayed by the display device.
Figure 5:
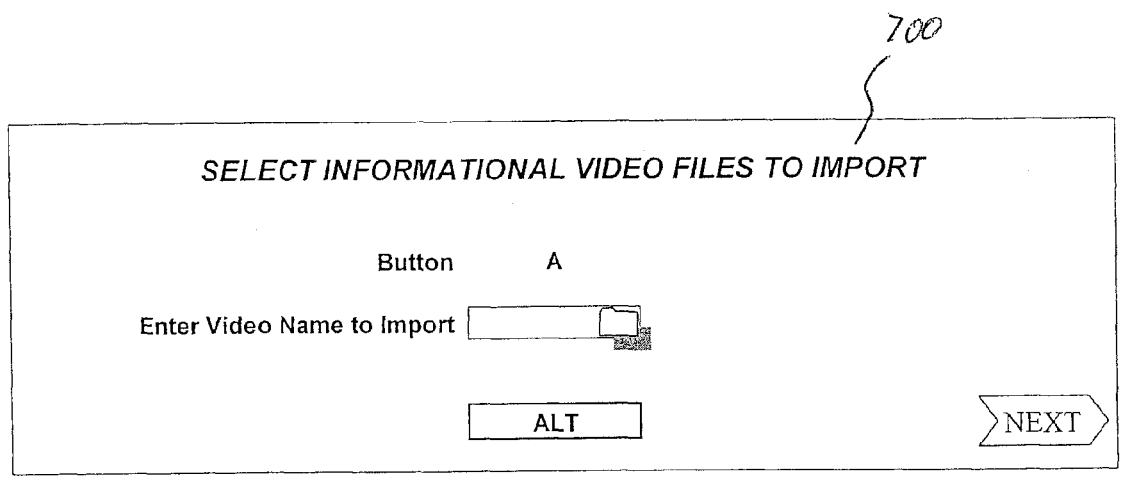
FIG. 5 is an exemplary Import Window 700 that is displayed automatically when the conversion software is loaded and launched.

Two methods of installing or updating the video content information on a display device are shown in FIG. 4A. The video files are not directly transferred to the display device. Such a method has disadvantages that it requires the display device to be networked in some manner and to include networking capabilities. It also requires the device to have sufficient hardware and software to receive and process the video files. Instead, the video files are imported into a personal computer and are then converted by a software program installed and operating in the personal computer. This allows video files of various formats, such as AVI video files, to be used for content information to be displayed by the display device without the display device being capable of processing such video file types.

A person utilizes the computer software to create and export a single file that includes all video content and features to be implemented in the display device. The export file could include programming files such as, for example, a plurality of different firmwares. A firmware could, for example, control the features and functions performed by the buttons on the display device, to control the motion sensors, and to set the maximum activation time delay of the motion sensors. Thus, the functions and capabilities of the display device can be changed and improved.

A description of the functioning of exemplary PC conversion software will now be provided. This embodiment is by way of example only, and the PC conversion software may function differently than described here.

When the conversion software is loaded and launched, an Import Window 700 as shown in FIG. 5 will automatically be displayed. The Import Window 700 allows the user to select informative AVI video files to import. The file name selected under each button identifies which AVI file is placed when that button is pressed. The user can directly type the directory and file name they wish to use for each button or select the file icon to browse their hard drive for the correct file to import. Duplicate file names can be inserted into multiple boxes if the user wishes. However, the display device flash memory will automatically only store the duplicate file once to conserve memory and repeatedly play that video as indicated in FIG. 5.

If the ALT icon in Import Window 700 is pressed, the window's 10 appearance changes to reveal two additional alternate video files per button. See Window 800 in FIG. 6. Each time the button is pressed, it will play one video. All the video files entered will play in the sequence shown by Window 800. For example, the first, second and third times that button A is pressed, it will play "Enter Video Name to Import", "Alternate Video 1", "Alternate Video 2", respectively. The fourth time button A is pressed, it will repeat the sequence and so on.

If file names are not inserted into all locations on Window 800, only the files included will be played back. For example, if only two video files are entered for button A, each time button A is pressed, it will alternate playing the one of the two video files entered.

The Hide Alt icon can be pressed to go back to the single video file per button option shown in Window 700 The NEXT icon is pressed to continue with the selected video files.

The window will change to display Teaser Window 900 in FIG. 7 to display the Teaser file to import. This window allows the user to select teaser AVI video file(s) to import. The file name selected identifies which AVI file is played when the motion sensors are activated. The user can directly type the directory and file name they wish to use or select the file icon to browse their hard drive for the correct file to import. If a duplicate file was used in the Informative or Teaser chart, the display device flash memory will automatically only store the duplicate file once to conserve memory and repeatedly play that video as entered.

If the "No Teaser Used" box is checked, it will automatically delete all video names entered in the Teaser Window 900 and turn off the motion sensors during operation. If the ALT icon is pressed, Window 1000 in FIG. 8 appears to reveal additional alternate video files triggered by the motion sensors. Each time the motion sensors are activated, the display device will play one video. All the video files entered will play in the sequence shown in Window 1000. For example, the first, second and third times the motion sensors detect motion, it will play "Enter Video Name to import", "Alternate Video 1", "Alternate Video 2" and "Alternate Video 3" respectively. The fourth time the motion sensors detect motion, it will repeat this sequence and so on.

If file names are not inserted into all locations in Window 1000, only the files included will be played back. For example, if only 2 video files are entered, each time motion is detected, it will alternate playing the 1 of the 2 video files entered.

The "End Video For All" area indicates the AVI file that should play after all Teaser videos entered above it. This feature is used to conserve flash memory if a common Teaser ending is used for all Teaser Videos. If no "End Video For All" is entered, then this feature will not be used during operation.

The Hide Alt icon can be pressed to go back to the single video file Teaser Window 900. When the NEXT icon is pressed, it continues with the video file names selected. The BACK icon moves back one menu screen.

As mentioned before, the display device preferably has a sleep mode. Exemplary characteristic of the sleep mode are as follows. The motion sensors (and teaser video playback) are turned off for a pre-defined number of minutes X if the motion detector is triggered a pre-defined number of times Y or more within X*Y+20 seconds. Button A on the display device continues to work during this time. These settings intend avoid retailer issues when store personnel are situated in front of the unit (i.e. stocking shelves, etc.).

Figure 9:
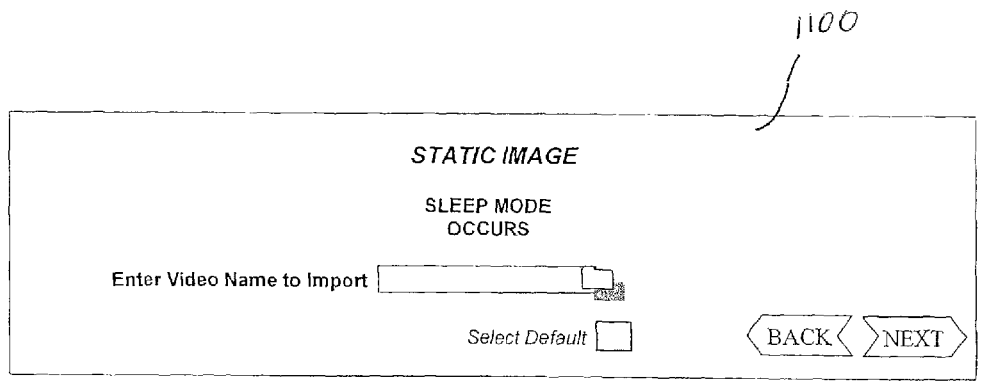
FIG. 9 is an exemplary Window 1100 for identifying a static image or screen saver to appear on the display when entering sleep mode.

A static image or screen saver will appear on the display when entering sleep mode using Window 1100 in FIG. 9. The static image file is imported as a 1 frame AVI file (and stored in the flash as 1 frame) that is repeated at 10 fps for 5 seconds. A screen saver is imported as an AVI file having a small number of frames. The user can directly type the directory and file name they wish to use for feature.

If the Select Default box is checked, a preprogrammed Default image will be displayed at 10 fps for 5 seconds for this feature. Press NEXT to continue with the video file names selected. Press BACK to move back one menu screen. If buttons are pressed equal to or more than Z times in 90 seconds, the Display device unit will not turn on again for 60 seconds. The motion detector and buttons will not activate during this shut down period.

Figure 10:
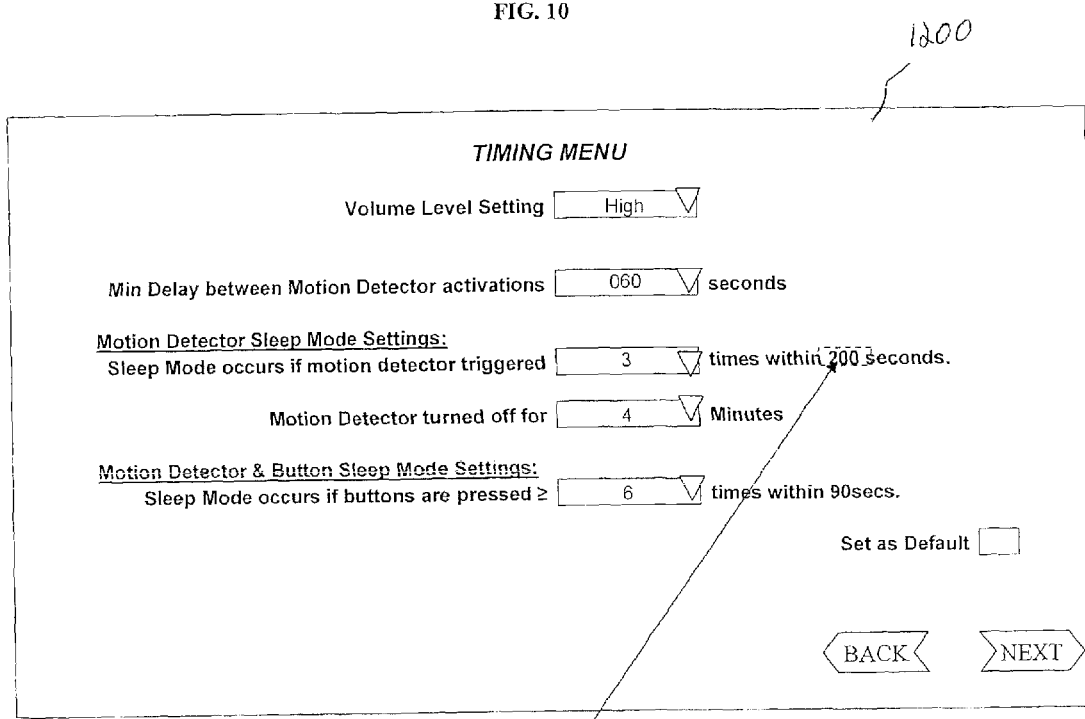
FIG. 10 shows an exemplary Timing Select menu 1200.

The window will change to display the Timing Select menu 1200 in FIG. 10. This menu allows customization of several timing and other settings that the display device will use during operation.

A menu of exemplary settings is shown in FIG. 12. The Volume Level Setting selects whether High, Medium or Low maximum volume is to be used during operation. These volume levels are selected by external resistors that can be tuned subsequent to EP stage.

The Min Delay between Motion Detector activations setting states the number of seconds for which the motion sensor will be shut down after it has been triggered. During this shutdown period, the motion sensors and Teaser video(s) will not be activated. Only buttons can be pressed to play informative videos.

Motion Detector Sleep Mode settings means that the motion sensors (and Teaser video playback) will be turned off for X minutes if the motion detector is triggered Y times within three (3) minutes. The Motion Detector & Button Sleep Mode Settings means that, if push buttons are pressed more than Z times in 90 seconds, the Display device unit will not turn on again for 60 seconds.

While in power saving mode, the motion sensors will turn on for 0.10 seconds and then off for 1.0 seconds in an effort to detect customer's presence. If the motion detector is activated (customer is sensed), then the Teaser video will be played. The on and off times above are starting points only and are to be tested and finalized by working samples prior to code release. If user selects a triangle icon next to each setting on the menu above, a drop down menu will appear providing the following options for each setting.

The values displayed in the Time Select menu screen should be used as the original Default starting values. If the "Set as Default" box is checked and FINISH icon is selected, the values last used for all settings should become the new Default starting values.

Press BACK to move back one menu screen. Press NEXT to continue onto window 1400 in FIG. 12. The window prompts the user to enter the nine digit "Film Number" that identifies which ad placement this data file will be used for. Internally the data file will be recognized by the display device by this Film Number. Also the name of the file exported will be "Film123456789.RAR" (file extension TBD) with 123456789 being the digit film number entered. Each film number will be associated with a 9 digit Description that is entered in Window 1400. This Description serves as a secondary check that confirms the correct data file video is downloaded for that particular ad placement. Each digit of the Film Number and Description can be entered as either numbers or capitalized letters. The program will automatically change lower case letters to appear as upper case if entered.

Press BACK to move back one menu screen. Press FINISH to create and export the data file in a compressed state. A suitable compression algorithm is used that will minimize the size of the data file exported from the PC Conversion software. For example, WinZip can be used or WinRAR can be used which provides a higher level of compression as compared to WinZip. For ease of handing, the export file is preferably kept to a size of less than 1 GB.

The export file also includes all of the video content files desired for the display device. Of course, there are a number of different video files included in the exported file. These video files could for example correspond to a plurality of different products. There is preferably also a teaser video included in the export file, which is displayed as indicated above. The export file could thus be easily made to correspond to content development cycles commonly utilized in the point-of-purchase advertising industry, such as ad placements, etc. In particular, the export file can be created by personnel of a company selling products or of an advertising agency.

The export file can be installed in the display device in one of two ways. First, flash memory cards can be produced for each ad cycle, the flash memory cards containing all of the data files segmented in memory for individual transfer as desired to the display device. The number and length of files is limited only by the capacity of the flash memory card. Capacities of up to 4 GB are now readily available. The flash memory cards may be produced at a location different than the computer used to produce the export file. For example, the data files in the export file can be zipped together and the zip file can be forwarded by suitable means, such as by email, to the other location. Preferably, the flash memory cards are suitably packaged with respective labels for easy identification and use by field personnel responsible for transferring the content to the display device. The labels may include a logo or other identifying information, the name and cycle # of the content.

The field personnel transfers the data by inserting a flash memory card into the memory card slot of the display device. Using the buttons or on-screen prompts, the field personnel selects the files desired to be transferred to a particular display unit. For example, the flash memory card may contain video files for a variety of products. The field personnel would note the product at which the display device is located and transfer the appropriate video file(s). Of course, the flash memory card includes firmware to improve the functionality of the display device, that shall be transferred as well.

Security measures may be implemented to ensure that the files are transferred and played only by an authorized display device. Such security measures may include encryption of the video card to prevent use of the files by other devices.

When a memory card is inserted into the display device it will verify it has the security handshake protocol. The display device will not communicate with any memory card that does not have the security handshake protocol in memory. When the security protocol is verified, it will automatically perform a battery check to determine if the batteries installed in the display device are fresh. This is to eliminate accidentally leaving old batteries in the display device.

Figure 26:
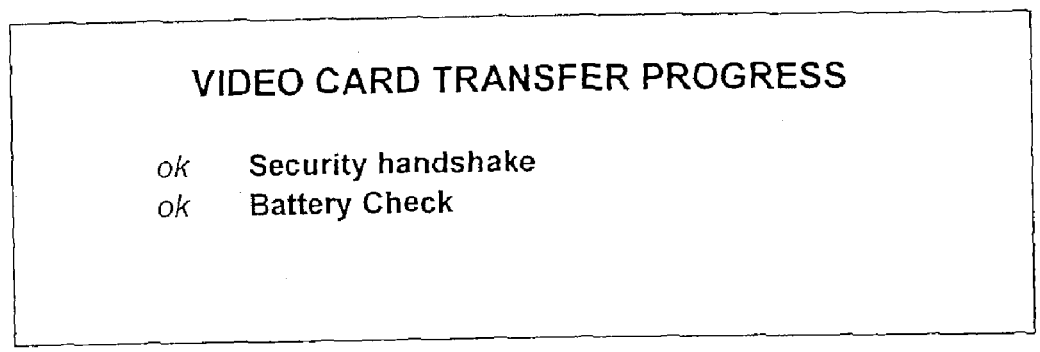
FIG. 26 is an exemplary window that appears when the batteries are checked to be OK.
Figure 27:
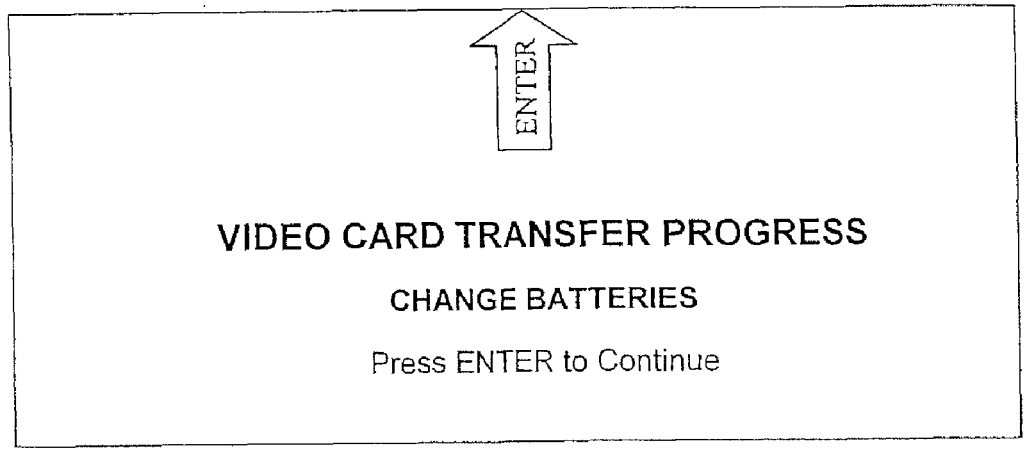
FIG. 27 is an exemplary screen which appears if the battery voltage is unacceptably low.

If the battery voltage measured is greater than 2.8 Volts +/−0.1V, then a screen such as the one shown in FIG. 26 will appear on the Display device screen for 3 seconds. If the battery voltage measured is less than 2.8 Volts +/−0.1V, then a screen such as the screen shown in FIG. 27 will appear. Press ENTER to continue (which is Button A) and the display device screen will change to a screen such as the screen shown in FIG. 28.

Figure 28:
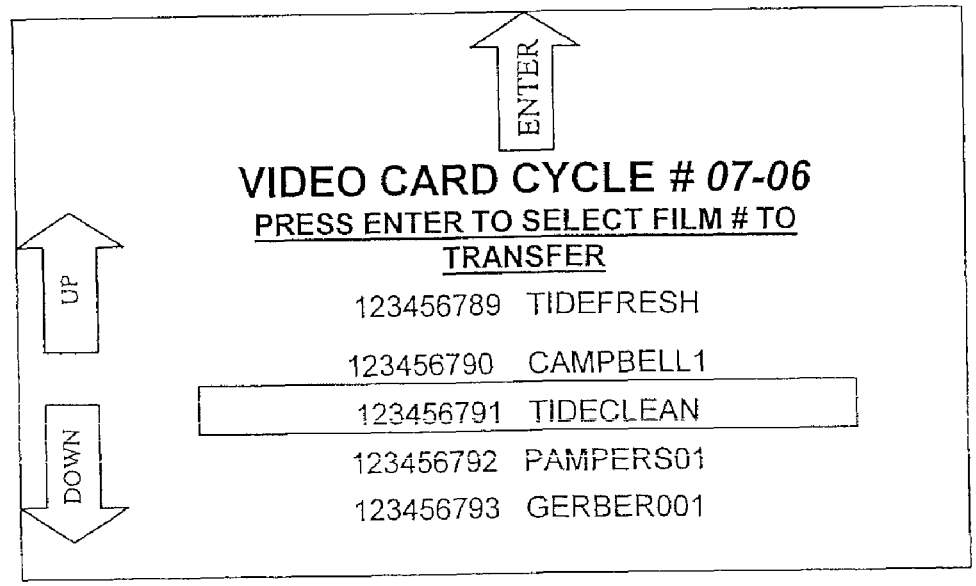
FIG. 28 is an exemplary window that displays the file numbers and descriptions of video files on a memory card.

Each memory card will have a Memory Card Name that is a multi-digit number, such as a number with cycle # and year (i.e. 07 and 06 represents the cycle number and year respectively as shown above). The Memory Card Name will be displayed on the display device screen such as shown in FIG. 28.

The Display device screen may automatically display 5 data files, with respective film Numbers and linked descriptions on the memory card. These data files may be listed in sequential order by Film Number.

The buttons on the Display device may be used to enter the film number so the correct data file from the memory card is transferred. When the Up Select Button is pressed, the display will scroll up through the list of Film Numbers. When the Down Select Button is pressed, the display will scroll down through the list of Film Numbers. When Button A is pressed, the device will enter the Film Number selected and move to the next screen.

Figure 29:
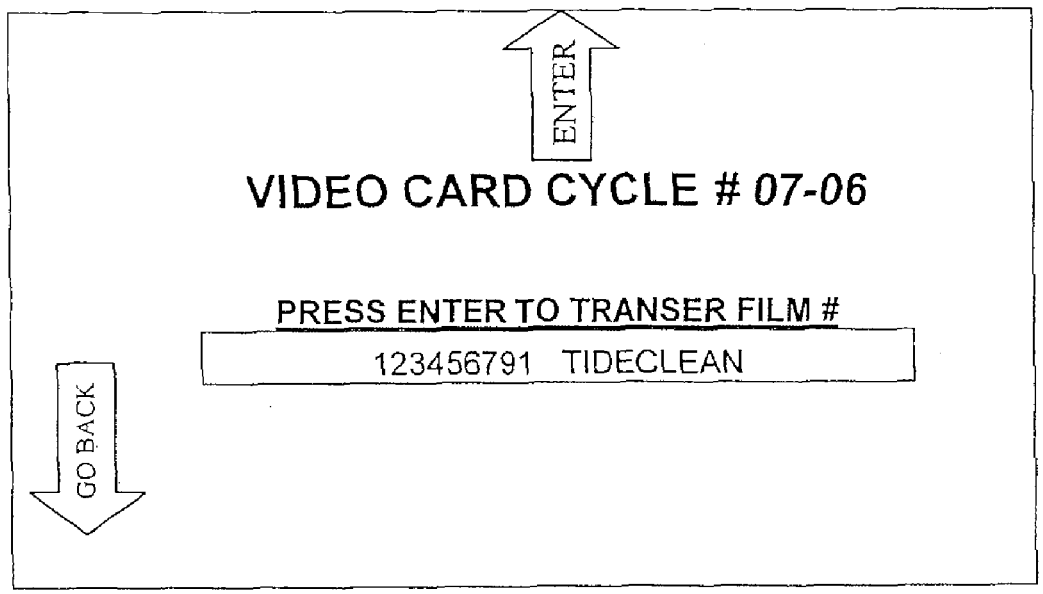
FIG. 29 is an exemplary screen that confirms the Film # to be transferred.
Figure 30:
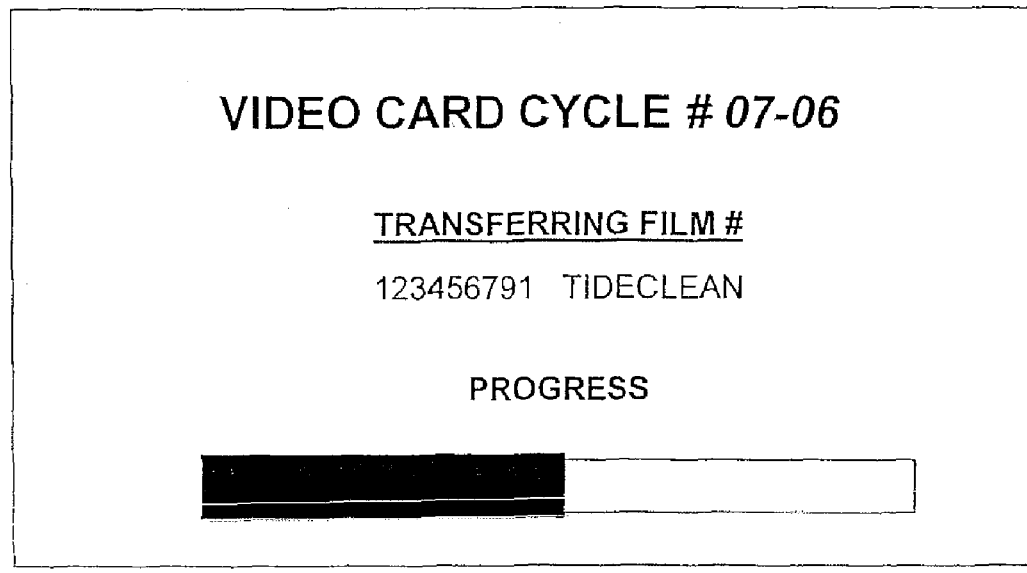
FIG. 30 is an exemplary window that appears when a video file is being transferred.

Once the file number has been selected, a screen such as that shown in FIG. 29 will appear to confirm the Film # that should be transferred. Pressing the Down Select Button causes the display to go back one screen. Enter is pressed to confirm and continue with the transfer of the Film #, and a window, such as that shown in FIG. 30 with a progress bar along the bottom that moves to the rightwards as more data is transferred, is displayed.

When the transfer is complete, a window such as that shown in FIG. 31 is displayed. The display device will not resume normal operation until the memory card is removed.

Alternatively, instead of flash memory cards, the export file can be transferred to another computer environment, and from there transferred to an appropriate handheld or field-optimized computing device, such as the Fujitsu PC Model#P1510D. The export file can be stored and managed as desired in the other computer environment. For example, the other computing environment may utilize various centralized work order processes for updating a variety of advertisements and the export file for the display device may thus be controlled to be released in the field at the same time as other advertising in a corresponding ad cycle. The handheld computer may be synchronized with the centralized work order processes so that the field personnel transfer files to the display device at a desired date or time.

Of course, in a simplified embodiment, the personal computer that creates the export file may be the same computer used to transfer the files to the display device. However, different computers are preferably used so that the transferring computer does not have to have extensive video import and processing capabilities and is easy to carry, etc., and the computer used to generate the export file has processing capabilities greater than what can be done in the highly portable computer.

Figure 4B:
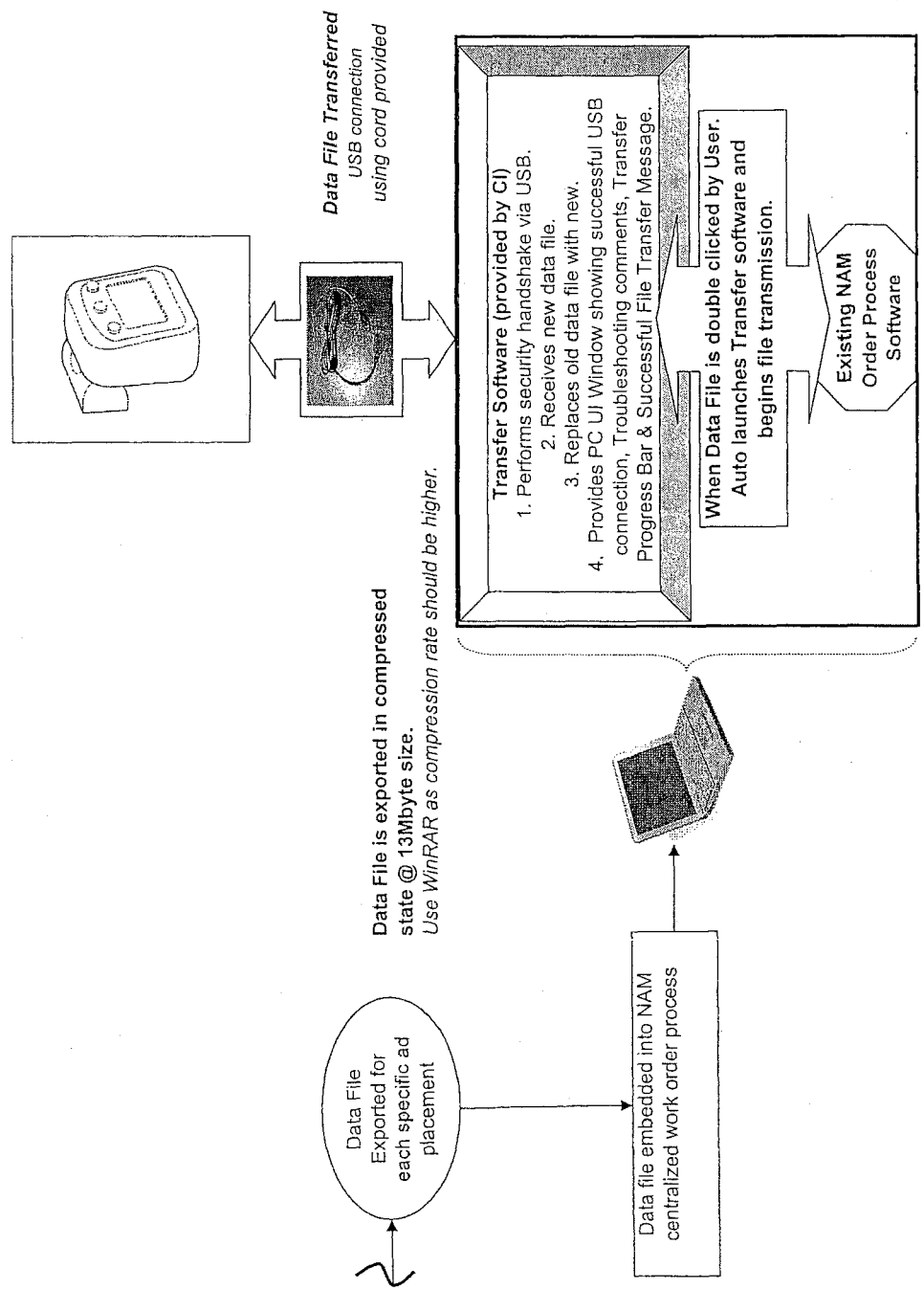
FIG. 4B is a diagram illustrating an exemplary, non-limiting embodiment of the process of transferring files from a handheld computer to the display device.

An overview of the PC transfer process is shown in FIG. 4B. The portable handheld computer should include software program, which when executed by the computer, allows the selected files to transferred under user control, as well as USB driver software for transferring the files to the display device. The software and USB driver software may be included in the export file or may be separately sent to the handheld computer. The software may be sent automatically or manually.

To transfer files, the field personnel runs the transfer software and connects the handheld computer to the USB port 150 of the display device with a USB cable. A security handshake is performed via USB to establish a connection. During transfer, a window with a user interface appears on the handheld computer. Then, the field personnel operates the handheld computer to transfer the desired files for that specific ad placement to the display device. The transfer software in the handheld computer expands the compressed data file and transfers the uncompressed file as a self-extracting file to the display device. The display device receives the new data file and replaces the old data file with the new data file. The UI window provides any troubleshooting comments, a transfer progress bar and a successful transfer message.

An exemplary, non-limiting, embodiment of the transfer software will now be described. When executed, the software will automatically begin the following steps to transfer the data file to the display device.

The software will first verify that the display device is successfully connected to the PC Handheld using a USB cable. If the USB is successfully connected, an indication to that effect will appear and it will proceed to with the transfer process.

If the USB connection does not occur successfully, a troubleshooting process will start. The computer will remind the user to check the connection to the display device and handheld computer, making sure both ends of the USB cord are fully inserted into the USB sockets of the display device and the handheld computer. An example is shown in Window 1500 in FIG. 13. After user presses "Check Again" in Window 1500, the software will verify if the connection is now successful. If so, it will proceed to display that there is a successful USB connection. If the connection is not successful, another troubleshooting screen may appear, such as the example screen 1600 shown in FIG. 14.

Figure 16:
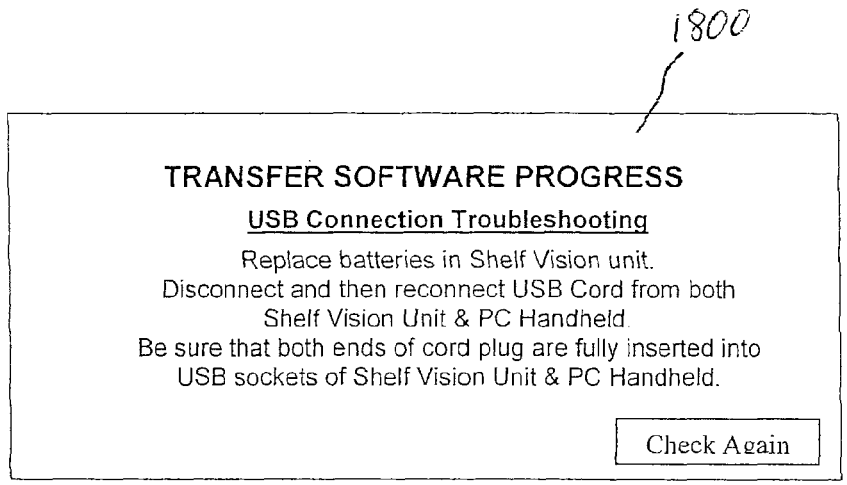
Figure 17:
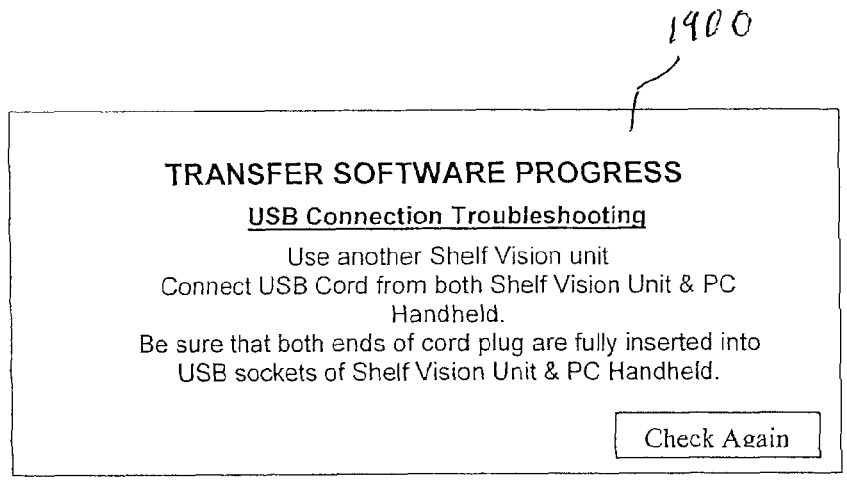
Figure 18:
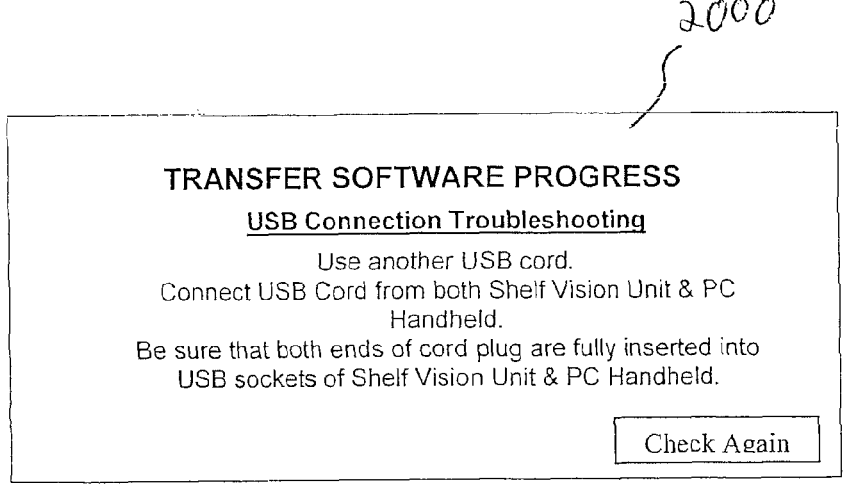

After user presses Check Again in Window 1600, the software will again verify if the connection is now successful. If so, it will proceed to display that there is a successful USB connection. If not successful, another troubleshooting screen will appear, such as the screen 1700 shown in FIG. 15. After user presses Check Again in Window 1700, the software will again verify if the connection is now successful. If so, it will proceed to display that there is a successful USB connection. If not successful, another troubleshooting screen, such as the screen 1800 in FIG. 16, will appear. After the user presses Check Again in screen 1800, it will again verify if the connection is now successful. If so, it will proceed to display that there is a successful USB connection window. If not, another troubleshooting screen such as the screen 1900 shown in FIG. 17 will appear. After user presses Check Again in screen 1900, the software will again verify if the connection is now successful. If so, it will proceed to display that there is a successful USB connection. If not successful, another screen such as screen 2000 shown in FIG. 18 will appear.

After user presses Check Again in screen 2000 the software will verify for the last time if the connection is now successful. If so, it will proceed to display that there is a successful USB connection. If not successful, the troubleshooting process will start again with screen 1600 in FIG. 14.

Figure 19:
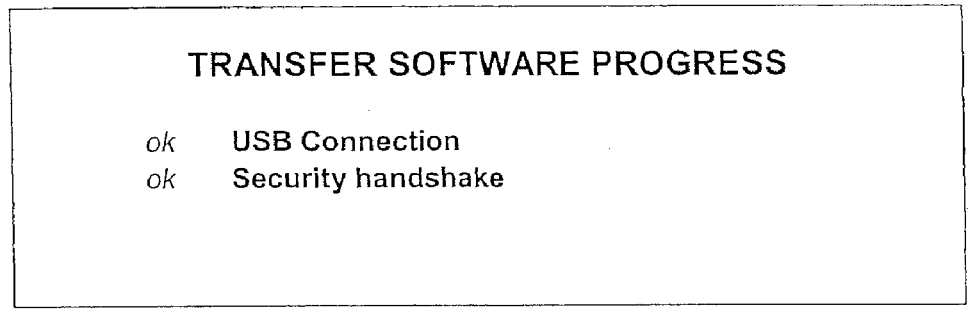
FIGS. 19-23 are exemplary windows that may appear during the process of transferring files.

After a successful USB connection, a security handshake protocol is executed to verify that the USB device connected to the display device is the handheld computer with the transfer software. If another USB device is plugged into the display device, it will not allow communication or access unless it has the proper security handshake of the transfer software. Once the security handshake protocol is established, the display device screen will turn off to conserve battery life. If another USB device without the security handshake is plugged into the display device, normal operation will continue uninterrupted. See FIG. 19.

Figure 20:
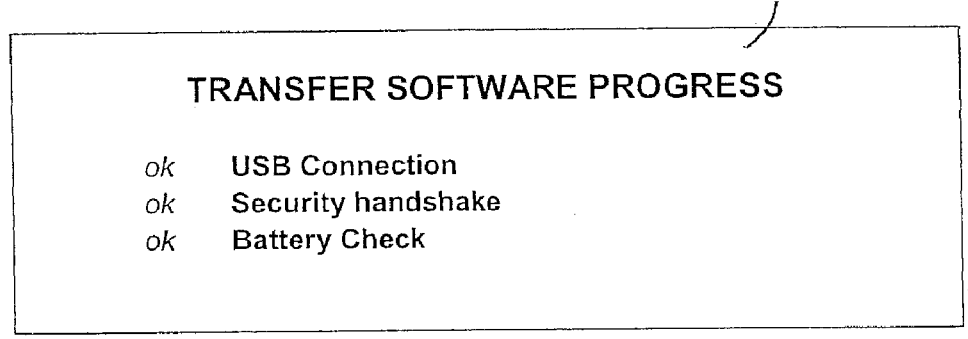

Next, a battery check is automatically performed to determine if the batteries installed in the display device are fresh. This is to eliminate accidentally leaving old batteries in the Display device. If the battery voltage measured is greater than 2.8 Volts +/−0.1V, then a battery check OK screen such as the screen 2200 shown in FIG. 20 will appear.

Figure 21:
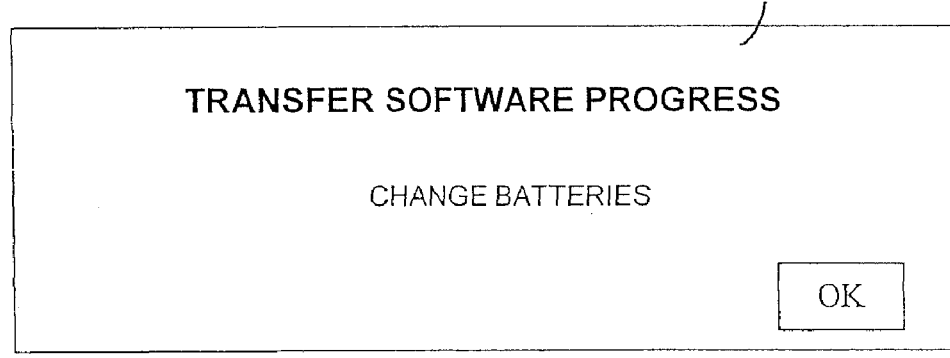

If the battery voltage measured is less than 2.8Volts +/−0.1V, then the change batteries screen 2300 shown in FIG. 21 will appear. The field personnel will press the OK icon to continue on to replace the batteries in the display device.

Figure 22:
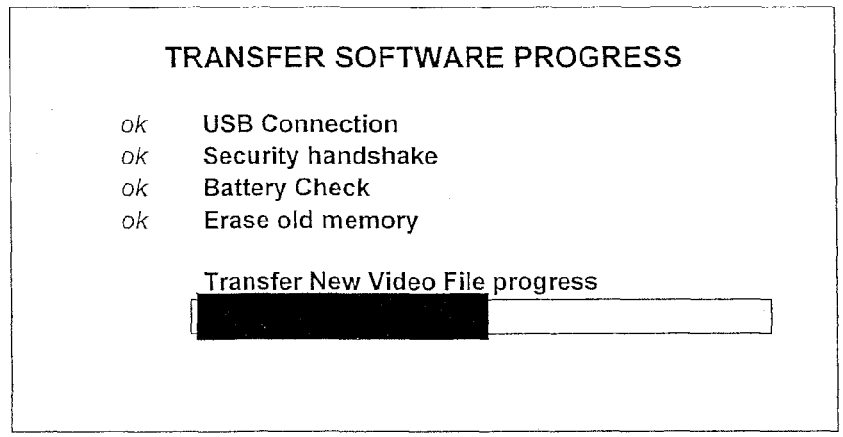
Figure 23:
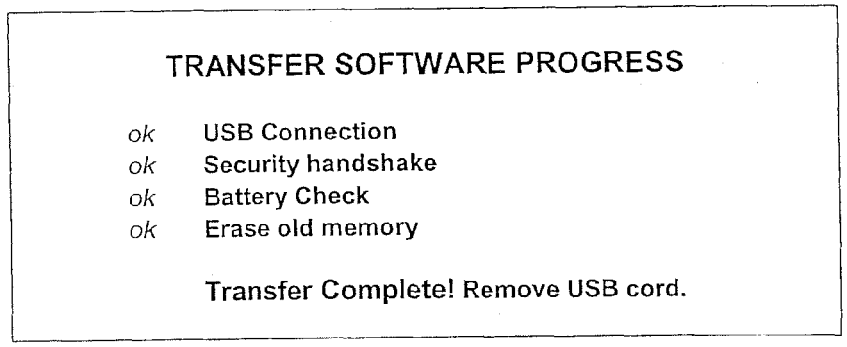

When batteries in the display device are OK, the contents in the flash memory on the display device are deleted. The Transfer Software then extracts the compressed data file in the handheld computer for transfer to the display device flash memory. The window appearance will change as shown in FIG. 22 with a progress bar along the bottom that moves to the rightwards as more data is transferred. When the transfer is complete, the window will change as shown in FIG. 23.

Figure 24:
FIG. 24 is an exemplary window that may appear when the flash memory of the display device is empty.

A screen such as screen 2600 shown in FIG. 24 will appear when the display device flash memory is empty. Screen 2600 will stay on until a handheld computer or memory card with security handshake is used to program its flash memory.

Figure 25:
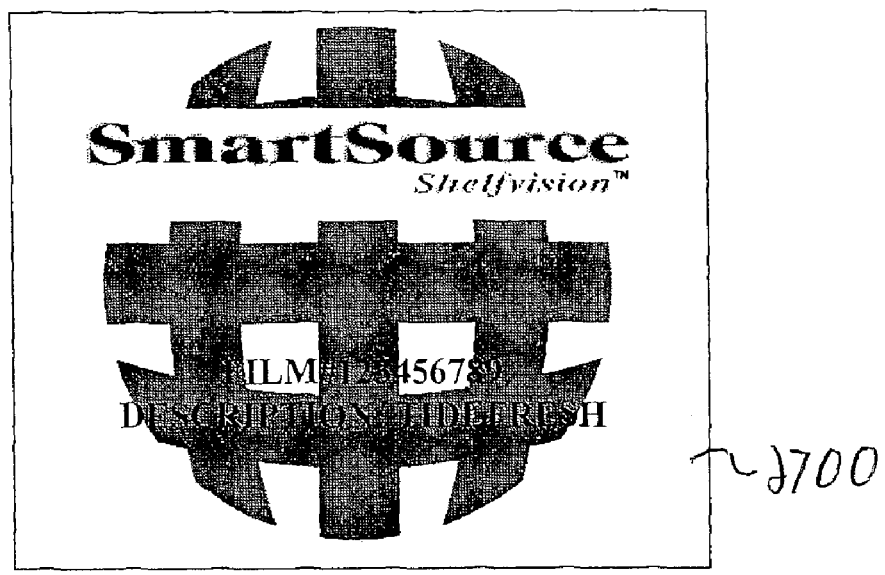
FIG. 25 is an exemplary window that may appear if the flash memory of the display device has been programmed.

A screen such as screen 2700 shown in FIG. 25 will appear if the display device flash memory has been programmed by either a memory card or a handheld computer (via USB). As a reference, a multi-digit "film number" and "description" in memory will appear on the bottom of the power up screen as shown in screen 2700 by "1234546789" and "TIDEFRESH". This power up screen will stay on until: (i) any button on the display device is pressed, (ii) a handheld computer with security handshake is connected, (iii) a memory card with security handshake is connected, or (iv) until 60 seconds after power up has elapsed. If (i) or (iv) occurs, the display device will resume normal operation.

The transfer software in the handheld computer may also include the same sleep mode features as in the PC Conversion software and discussed above with respect to FIGS. 9 and 10. The transfer software may also include the speaker volume settings and AGC features as in the PC Conversion software and discussed above with respect to FIG. 11.

While there are other benefits, two noteworthy advantages of the embodiments are as follows. The first is extremely low power usage or conversely super-efficient power consumption management. While internal power usage modes and a preferred power conservation regime was discussed above, those of skill in the art will also recognize that the present unit may easily be adapted to operate from a central power (AC) supply—either as a back up or as a main power supply.

The second benefit in the preferred embodiments of the present invention is that no particular external infrastructure is required to update the fields or operational hardware or software. In other words the electronic controls allow personalized updating on a unit-by-unit basis without the need for a prohibitively expensive wireless transmission and monitoring system joined to a base transmitter external to a retail outlet. As an aside, the back cover of the device is preferably key locked which guards the valuable battery cells, a USB port and limits unit damage.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. An updating method of updating content to be displayed on an automated display device comprising the steps of:
   (a) creating video files including product information communicable to a person for said automated display device which comprises:;
      (i) at least one motion sensor on said automated display device for determining the presence of said person;
      (ii) a switch or a button on said automated display device;
      (iii) a control circuit on said automated display device communicating with said at least one motion sensor, said control circuit causes said automated display device to display video information and to operate in different power modes via software or firmware based at least in part on the presence of said person as determined by said at least one motion sensor;
      (iv) a screen on said automated display device, said automated display device being responsive to activation by any of said at least one motion sensor or said screen, said software or firmware operable via said screen or said switch or said button; and
      (v) a fixing apparatus or a repositionable or lockable stalk for attachment of said automated display device to a shelf along an aisle or a display within a store;
   (b) storing said video files in a memory card or a handheld computer, said video files included in at least one export file stored on said memory card or said handheld computer;
   (c) connecting said memory card or said handheld computer to said automated display device; and
   (d) transferring said video files to said automated display device over said connection, whereby software carries out said transferring step and includes an interface,
   said interface permits selection of an image or at least one said video file to be transferred to said automated display device when said automated display device is in sleep mode or time off mode or when activated,
   said interface permits a user to make a variety of settings used by said automated display device during operation including the ability to
   turn off a teaser video playback,
   adjust how sleep or no play software modes occur based on activations by said at least one motion sensor or said screen or said switch or said button,
   adjust said video file playback sequence, select whether a pre-programmed or a transferred image file is used for the static image, and select high, medium, low, or automatic gain control playback volume.

2. An updating method as recited in claim 1, wherein said at least one export file also including playback features related to said video files.

3. An updating method as recited in claim 2, wherein at least a first one of said video files is designated said teaser video file to be played in response to activation of said at least one motion sensor or at least a second one of said video files is designated to be an informative video file to be played in response to activation of said screen or said switch or said button on said automated display device.

4. An updating method as recited in claim 2, wherein said at least one export file is embedded into a centralized work order process.

5. An updating method as recited in claim 3, wherein said at least one export file also includes programming logic, which when transferred and installed on said automated display device, controls at least one part of the operation of said automated display device.

6. An updating method as recited in claim 5, wherein said programming logic sets the maximum activation time delay of said automated display device by said at least one motion sensor or said switch or said button.

7. An updating method as recited in claim 1, wherein said interface includes a secondary check on transferred said video files.

8. An updating method as recited in claim 7, wherein said secondary check on transferred said video files corresponds to an ad placement or an ad cycle.

9. An updating method as recited in claim 1, wherein said transferring step includes a capacity check of the batteries installed in said automated display device and displays at least one message related to the capacity of the batteries on said automated display device.

10. An updating method as recited in claim 1, wherein said transferring step displays said at least one export file on said screen of said automated display device and said user selects one of said at least one export files for transfer.

11. An updating method as recited in claim 1, wherein said updating method includes a security handshake between said automated display device and said memory card or said handheld computer.

12. An updating method as recited in claim 11, wherein data on how said automated display device was used or activated is transferred from said automated display device to said memory card or said handheld computer as part of said transferring step.

13. An updating method as recited in claim 2, wherein said at least one export file is compressed.

14. An updating method as recited in claim 1, wherein said video files include audio accompanying the video, and said automated display device produces said audio for hearing when said video file is displayed.

15. An updating method as recited in claim 5, wherein said programming logic specifies the timing of a light effect pattern on said automated display device.

16. An updating method as recited in claim 15, wherein the timing of said light effect pattern comprises the blinking of a light emitting diode (LED).

17. An updating method as recited in claim 1, further comprising the steps of:
(e) removing said memory card from said automated display device after said transferring step; and
(f) repeating said connecting, said transferring, and said removing steps for at least one other said automated display device.

18. An updating method as recited in claim 17, wherein said automated display device resumes normal operation only after said removing step.

19. An updating method as recited in claim 1, wherein said automated display device enables said person to view at least one of said video files more than once by activation via said screen.

20. An updating method as recited in claim 1, wherein said automated display device enables said person to view at least one of said video files more than once by activation via said screen or said switch or said button.

* * * * *